G. MALONE.
TRACTOR.
APPLICATION FILED AUG. 21, 1918.
1,305,481.
Patented June 3, 1919.
3 SHEETS—SHEET 1.
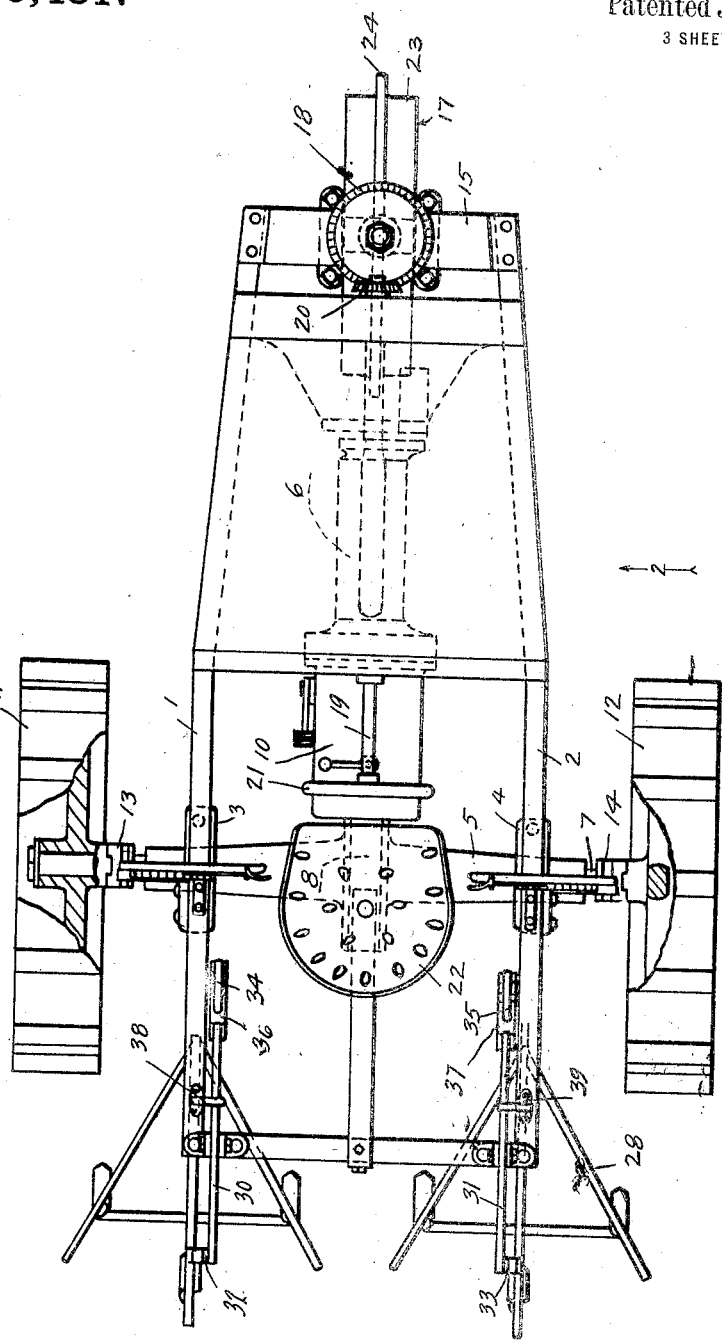
INVENTOR.
Gus Malone,
BY
Hazard & Miller
ATTORNEYS.

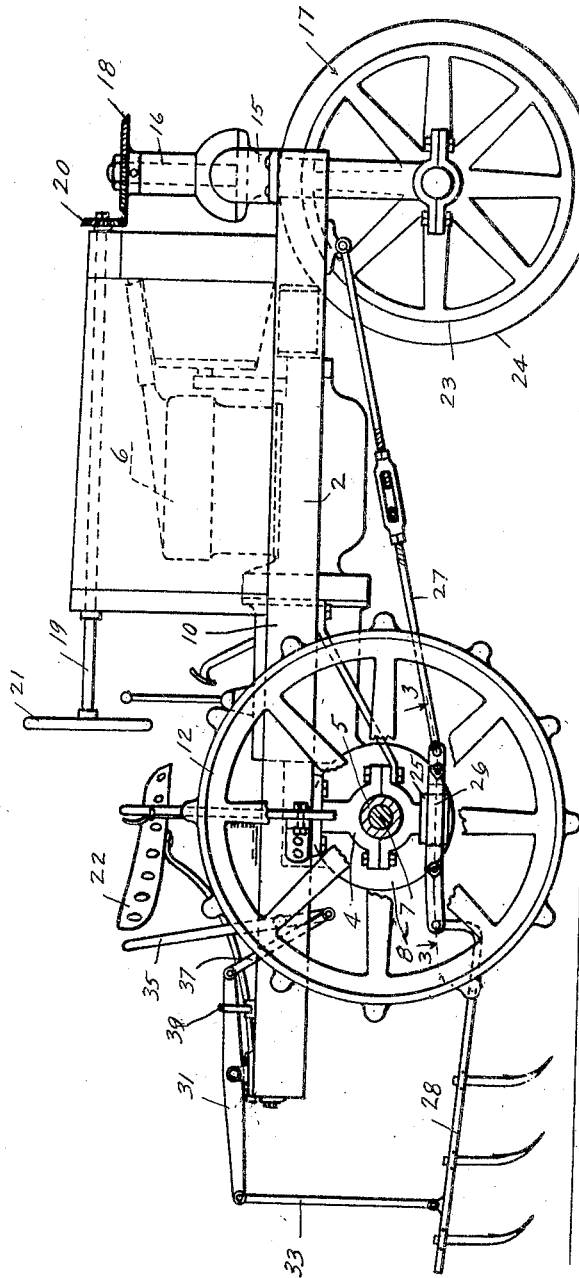

G. MALONE.
TRACTOR.
APPLICATION FILED AUG. 21, 1918.
1,305,481.
Patented June 3, 1919.
3 SHEETS—SHEET 3.
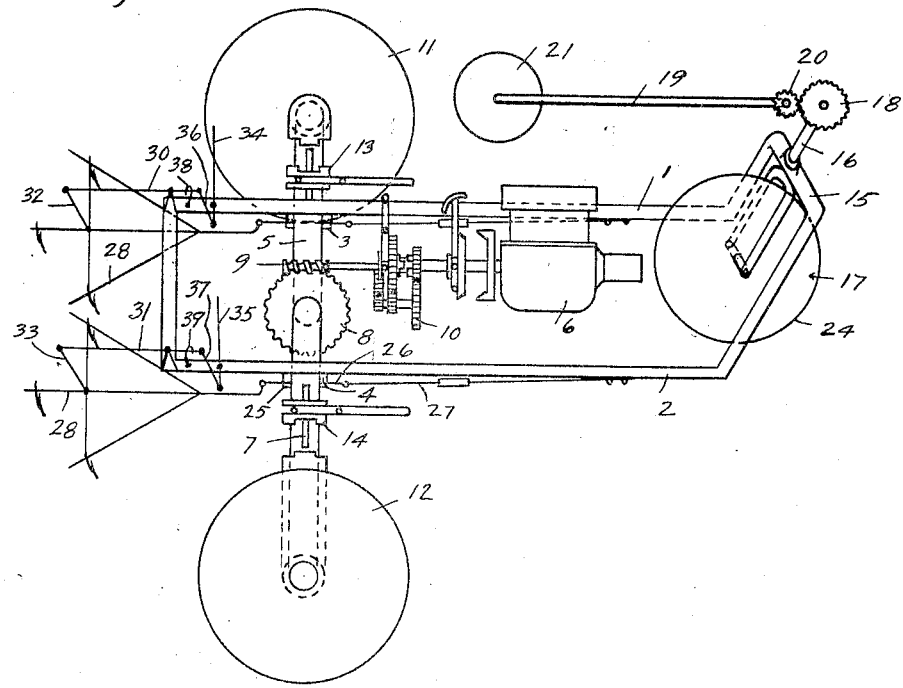
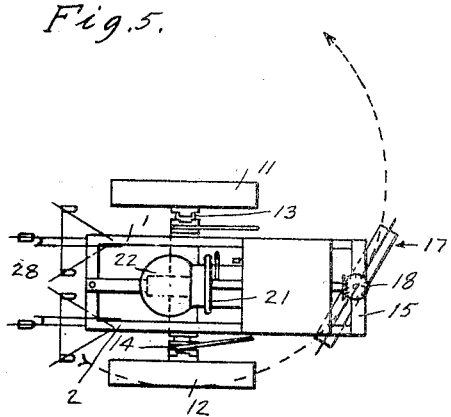
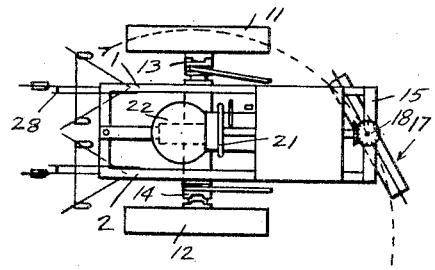
INVENTOR.
Gus Malone,
BY Hazard & Miller
ATTORNEYS.

UNITED STATES PATENT OFFICE.

GUS MALONE, OF COVINA, CALIFORNIA.

TRACTOR.

1,305,481.

Specification of Letters Patent.

Patented June 3, 1919.

Application filed August 21, 1918. Serial No. 250,785.

*To all whom it may concern:*

Be it known that I, GUS MALONE, a citizen of the United States, residing at Covina, in the county of Los Angeles and State of California, have invented new and useful Improvements in Tractors, of which the following is a specification.

My invention relates to tractors, and consists of the novel features herein shown, described and claimed.

Figure 1 is a top plan view of a tractor embodying the principles of my invention, parts being broken away and shown in section.

Fig. 2 is a side elevation looking in the direction indicated by the arrow 2 in Fig. 1.

Fig. 3 is an enlarged sectional detail on the line 3—3 of Fig. 2.

Fig. 4 is a diagrammatic view of the operating parts.

Fig. 5 is a diagrammatic view showing the tractor turning to the left.

Fig. 6 is a diagrammatic view showing the tractor turning to the right.

The side bars 1 and 2 of the main frame are mounted upon pillars 3 and 4, and the pillars 3 and 4 are rigidly mounted upon the rear axle housing 5. The engine 6 is mounted upon the side bars 1 and 2 in front of the axle housing 5.

The rear driving axle 7 is rotatably mounted in the axle housing 5. A worm gear 8 is fixed upon the driving axle 7, and a worm 9 in mesh with the worm gear 8 is driven through the transmission 10 from the engine 6. The drive wheels 11 and 12 are rotatably mounted upon the driving axle 7. A clutch mechanism 13 connects the drive wheel 11 to one end of the driving axle 7, and a similar clutch mechanism 14 connects the drive wheel 12 to the other end of the driving axle 7, so that when both the clutches 13 and 14 are connected the tractor will drive straight ahead, and so that when the clutch 13 is disconnected the tractor will turn to the left as in Fig. 5, and so that when the clutch 13 is connected and the clutch 14 is disconnected the tractor will turn to the right as in Fig. 6.

A cross bar 15 connects the forward ends of the side bars 1 and 2. A steering wheel fork 16 is mounted vertically through the crossbar 15, and the steering wheel 17 is mounted between the tines of the fork. A bevel gear 18 is fixed upon the upper end of the fork 16. A steering wheel shaft 19 is mounted horizontally above the engine 6, and the bevel pinion 20 upon the forward end of the shaft 19 meshes with the bevel gear 18. The steering wheel 21 upon the rear end of the shaft 19 is within reach of the operator when sitting upon the seat 22.

The steering wheel 17 has a flat tread 23 with a central peripheral flange 24. The flange 24 is intended to form a blade to cut into the ground and hold the steering wheel from slipping sidewise.

Bearing blocks 25 extend downwardly from the pillars 3 and 4, and draft frames 26 are mounted upon the bearing blocks 25 to slide forwardly and backwardly to a limited extent. Turn buckle draft rods 27 connect the forward ends of the frames 26 to the forward ends of the side bars 1 and 2. The cultivators 28 are connected to the rear ends of the draft frames 26.

It is obvious that any form of plow or farm implement may be substituted for the cultivators 28.

When the turn buckle draft rods 27 are shortened as shown in Figs. 2 and 3 the strain of drawing the farm implement or other load is communicated directly to the front ends of the side bars 1 and 2, so as to pull downwardly upon the steering wheel and hold the steering wheel heavy upon the ground, so that the steering wheel will grip the ground and serve to guide the tractor. Where the pull is to be comparatively light the draft rods 27 may be lengthened by manipulating the turn buckles and allowing the frames 26 to move backwardly until the shoulders 29 engage the bearing blocks 25 and then the pull will be upon the rear end of the frame, and the steering wheel will run light.

Lifting levers 30 and 31 are pivotally mounted in substantially horizontal positions upon the rear ends of the side bars 1 and 2, the rear ends of the levers 30 and 31 being connected to the cultivators 28 by links 32 and 33. Hand-levers 34 and 35 are pivotally mounted upon the side bars 1 and 2 in substantially vertical positions, and links 36 and 37 connect the lower ends of the hand-levers 34 and 35 to the forward ends of the lifting levers 30 and 31, so that when either hand-lever 34 or 35 is moved backwardly the corresponding cultivator or farm implement 28 will be raised from the ground. Hooks 38 and 39 are mounted upon the side bars 1 and 2 in position to engage the lifting levers 30 and 31 in front of their pivots, so that when the cultivators have been raised the hooks 38 and 39 may be swung over the lifting levers 30 and 31 to hold the cultivators in their elevated positions.

The lifting mechanism makes it possible to raise and carry heavy implements with comparative ease.

Thus I have produced a tractor especially adapted for small farm work. Farm implements may be coupled close to the rear wheels, and the tractor may be manipulated in a small field close to fences, ditches, and the like. When it is desired to make a short turn, one drive wheel is disconnected and serves as a pivot around which the other drive wheel travels. The construction throughout is simple, and at the same time may be made of any desired strength.

Especial attention is called to the means for placing the pull of the implement upon the steering wheel to hold the steering wheel in engagement with the ground, so that it will not slide sidewise.

Various changes may be made without departing from the spirit of my invention as claimed.

I claim:

1. In a tractor, a main frame; pillars extending downwardly from the main frame; an axle housing rigidly connected to the lower ends of the pillars; bearing blocks extending downwardly from the pillars below the axle housing; draw frames slidingly mounted upon the bearing blocks; and turn buckle draft rods connecting the forward ends of the draw frames to the forward end of the main frame.

2. In a tractor, a main frame; a steering wheel supporting the forward end of the main frame; drive wheels supporting the rear end of the main frame; draw frames slidingly mounted relative to the main frame; and draft rods connecting the draw frames to the forward end of the main frame.

In testimony whereof I have signed my name to this specification.

GUS MALONE.